No. 782,985. PATENTED FEB. 21, 1905.
A. P. OLSON.
FRICTION CLUTCH.
APPLICATION FILED SEPT. 25, 1903.

Witnesses
R. J. Jacker
Annie M. Adams.

Inventor:
Andrew P. Olson
By Jno. H. Whipple
Atty.

No. 782,985. Patented February 21, 1905.

UNITED STATES PATENT OFFICE.

ANDREW P. OLSON, OF CHICAGO, ILLINOIS.

FRICTION-CLUTCH.

SPECIFICATION forming part of Letters Patent No. 782,985, dated February 21, 1905.

Application filed September 25, 1903. Serial No. 174,550.

*To all whom it may concern:*

Be it known that I, ANDREW P. OLSON, of Chicago, in the State of Illinois, have invented certain new and useful Improvements in Friction-Clutches, of which the following is a specification.

The invention relates to clutches having a cylindrical casing within which are arranged radially-movable friction-pieces adapted to be expanded against and retracted from the casing for causing the members to revolve together or freeing them so that one may remain idle while the other rotates; and the object of the improvement is to provide toggle-joint mechanism in conjunction with screw appliances for operating the friction-pieces. I have attained this object in the clutch constructed as illustrated in the accompanying drawings, in which—

Figure 1:
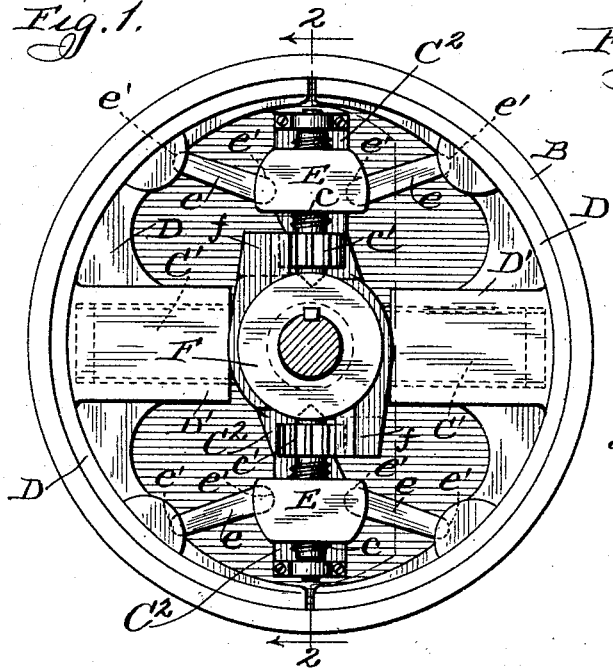
Figure 2:
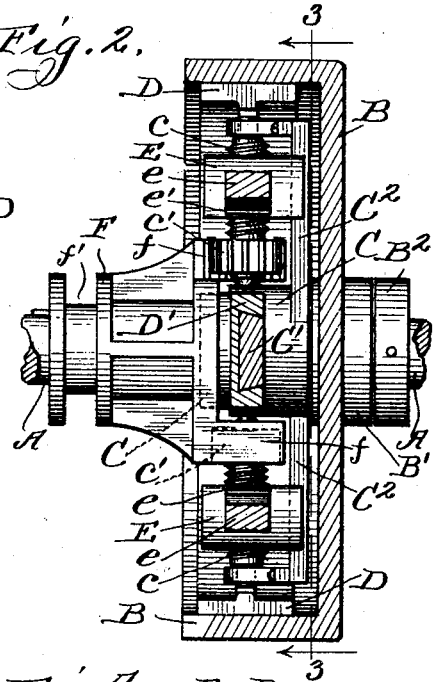
Figure 3:
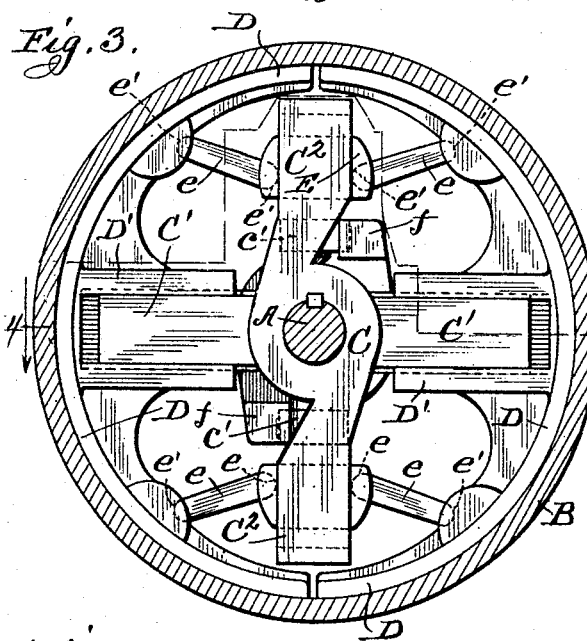
Figure 4:
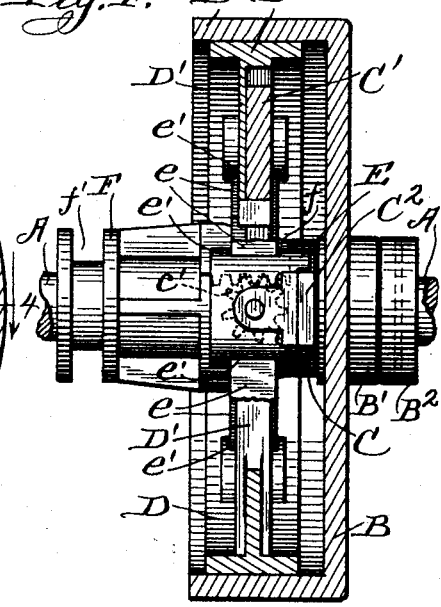

Figure 1 represents a side elevation, partly in section, of the clutch containing my invention. Fig. 2 is a section taken at right angles to the plane of Fig. 1 on the line 2 2. Fig. 3 is a section on the line 3 3 of Fig. 2, cutting the casing and showing the inner parts in elevation and representing the side opposite to that seen in Fig. 1. Fig. 4 is a horizontal section taken on the line 4 4 of Fig. 3.

In the drawings, A is a shaft; B, the cylindrical casing mounted loosely on the shaft; C, Figs. 2 and 3, a hub fixed to rotate with the shaft by feather and spline, but not to slide thereon; C', arms extending from opposite sides of the hub; D, the friction-pieces, made in half-circular form to fit the interior of the casing, and D' arms of said friction-pieces provided with a dovetail groove adapted to fit and slide on the arms C'. Other arms, C², placed quartering to the arms C', are extended from the hub C, and on each of these is mounted a screw-shaft $c$, provided with a pinion $c'$.

E is a nut or sliding block threaded on each of the screw-shafts and recessed to slide on the arm C², as seen in Fig. 4. Links $e$, adapted to swivel in sockets at $e'$, form a toggle-joint connection of the nuts with projections on the friction-pieces, as illustrated in Figs. 1 and 2.

On the shaft is secured by feather and spline, so as to slide thereon, a grooved collar F, provided with rack-bars $f$, adapted to engage the pinions $c'$ when the grooved collar is pushed in upon the hub C for rotating the screw-shafts in the direction required to move the nuts outward and spread the links $e$, thus causing the friction-pieces to expand against the interior of the casing to produce the necessary friction for causing the members of the clutch to rotate with the shaft. The reverse movement of the grooved collar will cause a reverse movement of said parts and relieve the friction, so as to break the continuity of rotation of the casing with the shaft. The grooved collar is to be worked to and fro on the shaft by means of a split ring in its groove $f'$, attached to a lever suitably mounted, all of ordinary pattern and not shown here because not deemed necessary.

The casing has a hub B', the inner end of which fits against the hub C, and a collar B², fixed to shaft A, keeps the casing in close but loose working relation with hub C. The casing may be geared with any machine for the transmission of its power thereto by means of a belt applied to its rim or hub or in any other well-known way.

When the grooved collar F is moved away from the hub C far enough to free the rack-bars from connection with the pinions $c'$, the latter may be turned by hand in order to adjust the friction-pieces in such close working relation with the flange-rim of the casing as to require only slight inward movement of the racks upon the pinions to produce very high friction between said parts.

Friction-clutches have been made with a shaft and cylindrical casing having an interior expanding and contracting clutch element in connection with toggle-joint mechanism for expanding it and spring-actuated mechanism for retracting it; but such constructions do not contain my invention, which dispenses with spring-actuated mechanism and affords means whereby a pinioned screw-shaft connected with the toggle-joint mechanism is connected with a reciprocating element in such manner as to operate said screw-shaft back and forth by the power of a lever applied to said reciprocating element. This result is attained by the sliding collar upon the shaft having a rack-bar projecting from the collar into the casing past said screw-shaft and engaging the pinion thereof, so as to control its movements back and forth for the purposes stated.

What is claimed is—

1. In a clutch a cylindrical casing and a pair of spreading friction-pieces in combination with toggle-joint mechanisms in connection with the friction-pieces, pinioned screw-shafts in connection with the toggle-joint mechanisms, and a sliding collar provided with rack-bars adapted to work the screw-shaft pinions, as specified.

2. In a clutch a cylindrical casing, a hub fixed to a shaft and provided with a pair of oppositely-extended radial arms, a pair of segmental friction-pieces mounted to slide on said arms, a pair of pinioned screw-shafts mounted at opposite sides of said hub and extended radially thereto and perpendicular to said arms, a sliding block threaded upon each of said screw-shafts, links swiveled at one end to opposite sides of said sliding blocks and at the other ends to the friction-pieces, and a sliding collar provided with rack-bars adapted to work the screw-shaft pinions as specified.

3. In a clutch of the class described the combination with the friction-pieces of a pair of pinioned screw-shafts arranged opposite to the axis of rotation and extended radially thereto, a block threaded upon each of said screw-shafts, pivoted links extended from opposite sides of each of said blocks and connected with the friction-pieces, and a sliding collar having rack-bars adapted to engage with the pinioned screw-shafts, as specified.

4. In a clutch, the combination with a cylindrical casing and pair of friction-pieces, of a pair of screw-shafts extended radially to the axis of rotation, and each provided with a pinion, a sliding block threaded upon each of said screw-shafts toward its outer end, links pivotally connected with the sliding blocks and with the friction-pieces, and a sliding collar provided with rack-bars arranged to engage the pinions of the screw-shafts, as specified.

5. In a clutch the combination with a shaft of a cylindrical casing, an expanding and contracting clutch element within the casing, toggle-joint mechanism in connection with said clutch element, a pinioned screw-shaft centrally connected with the toggle-joint mechanism, a sliding collar upon the shaft, and a rack-bar projecting from the sliding collar into the casing and engaging with the pinion of the screw-shaft, as specified.

ANDREW P. OLSON.

Witnesses:
MANCHA BRUGGEMEYER,
CHAS. A. WATHIER.